(12) United States Patent
Shao et al.

(10) Patent No.: US 12,078,497 B2
(45) Date of Patent: Sep. 3, 2024

(54) METHODS AND INTERNET OF THINGS SYSTEMS FOR JOINTLY PROCESSING SAFETY HAZARDS BASED ON SMART GAS GEOGRAPHIC INFORMATION SYSTEMS

(71) Applicant: CHENGDU QINCHUAN IOT TECHNOLOGY CO., LTD., Sichuan (CN)

(72) Inventors: Zehua Shao, Chengdu (CN); Yaqiang Quan, Chengdu (CN); Xiaojun Wei, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 18/360,795

(22) Filed: Jul. 27, 2023

(65) Prior Publication Data
US 2023/0366689 A1   Nov. 16, 2023

(30) Foreign Application Priority Data
Jun. 29, 2023   (CN) .......................... 202310777530.6

(51) Int. Cl.
*G01C 21/34*   (2006.01)
*G06Q 50/06*   (2024.01)
(Continued)

(52) U.S. Cl.
CPC ......... *G01C 21/3476* (2013.01); *G06Q 50/06* (2013.01); *G16Y 10/35* (2020.01); *G16Y 40/10* (2020.01)

(58) Field of Classification Search
CPC ............... G01C 21/3476; G06Q 50/06; G06Q 10/0635; G16Y 10/35; G16Y 40/10;
(Continued)

(56) References Cited

U.S. PATENT DOCUMENTS

2004/0031337 A1 * 2/2004 Masaniello ........ G01N 29/4445
73/865.8
2013/0325402 A1  12/2013 Vukojevic et al.
(Continued)

FOREIGN PATENT DOCUMENTS

CN   104392507 A   3/2015
CN   106408453 A   2/2017
(Continued)

OTHER PUBLICATIONS

Yang, Xuan et al., Research on Comprehensive Inspection of Power System Monitoring Information Based on Information Comparison, Sichuan Electric Power Technology, 39(4): 41-44, 2016.
(Continued)

*Primary Examiner* — Ziaul Karim
(74) *Attorney, Agent, or Firm* — METIS IP LLC (57) ABSTRACT

The embodiments of the present disclosure provide a method and an Internet of Things system for jointly processing a safety hazard based on a smart gas Geographic Information System (GIS). The method includes: determining target positioning data for placing at least one marking device based on inspection data of the gas GIS, wherein the at least one marking device is configured to obtain monitoring data of a target positioning area at at least one time point; determining an inspection analysis result based on the monitoring data and the inspection data; and determining at least one re-inspection route based on the re-inspection analysis result, and a feature of the re-inspection route includes at least one of a count of marking devices needing re-inspection, a sequence of re-inspection, or an attention level.

3 Claims, 5 Drawing Sheets

(51) Int. Cl.
*G16Y 10/35* (2020.01)
*G16Y 40/10* (2020.01)

(58) Field of Classification Search
CPC ........ G16Y 20/10; G16Y 40/20; G16Y 40/50; Y02P 90/30; F17D 5/005; F17D 3/01; F17D 5/02; G06F 16/29; G06F 30/18; G07C 3/00; H04L 67/12
See application file for complete search history.

(56) References Cited

U.S. PATENT DOCUMENTS

| | | | |
|---|---|---|---|
| 2017/0308796 A1* | 10/2017 | Heng | G06N 20/00 |
| 2019/0324444 A1* | 10/2019 | Cella | G05B 23/0291 |
| 2021/0181119 A1 | 6/2021 | Michaud et al. | |
| 2022/0057367 A1 | 2/2022 | Claudio et al. | |
| 2023/0083626 A1 | 3/2023 | Shao et al. | |

FOREIGN PATENT DOCUMENTS

| | | | | |
|---|---|---|---|---|
| CN | 106446033 A | * | 2/2017 | G06Q 10/0635 |
| CN | 106600447 A | | 4/2017 | |
| CN | 206224595 U | * | 6/2017 | |
| CN | 107967727 A | | 4/2018 | |
| CN | 109242291 A | | 1/2019 | |
| CN | 109284425 A | | 1/2019 | |
| CN | 109313939 A | | 2/2019 | |
| CN | 109375594 A | | 2/2019 | |
| CN | 109630905 A | * | 4/2019 | B64C 39/02 |
| CN | 110009760 A | | 7/2019 | |
| CN | 109858126 B | | 1/2020 | |
| CN | 111858120 A | | 10/2020 | |
| CN | 112268576 A | | 1/2021 | |
| CN | 112381610 A | | 2/2021 | |
| CN | 112598343 A | | 4/2021 | |
| CN | 112819262 A | | 5/2021 | |
| CN | 113301142 A | | 8/2021 | |
| CN | 113531400 A | | 10/2021 | |
| CN | 113689653 A | | 11/2021 | |
| CN | 114093052 A | | 2/2022 | |
| CN | 114458967 A | | 5/2022 | |
| CN | 114841238 A | | 8/2022 | |
| CN | 114879702 A | | 8/2022 | |
| CN | 115514099 A | | 12/2022 | |
| CN | 115545231 A | | 12/2022 | |
| CN | 115619071 A | | 1/2023 | |
| CN | 115640915 A | | 1/2023 | |
| CN | 115686063 A | | 2/2023 | |
| CN | 115690581 A | | 2/2023 | |
| CN | 115775088 A | | 3/2023 | |
| CN | 115907264 A | | 4/2023 | |
| CN | 115939996 A | | 4/2023 | |
| CN | 116011740 A | | 4/2023 | |
| CN | 116155985 A | | 5/2023 | |
| CN | 116168462 A | | 5/2023 | |
| CN | 116307447 A | | 6/2023 | |
| CN | 116308965 A | | 6/2023 | |
| JP | 2015072644 A | | 4/2015 | |
| JP | 2017157167 A | | 9/2017 | |
| KR | 20040103537 A | | 12/2004 | |
| WO | 2022234112 A1 | | 11/2022 | |

OTHER PUBLICATIONS

Yang, Jincheng et al., Study on Smart Meters Fault Identification Model, Electrical Appliances and Energy Efficiency Management Technology, 30-36, 2017.

Zheng, Fengshou et al., Research on the Gassmart Inspection System Design, Beijing Surveying and Mapping, 2015, 5 pages.

Decision to Grant a Patent in Chinese Application No. 202310777530.6 mailed on Aug. 18, 2023, 5 pages.

First Office Action in Chinese Application No. 202310777530.6 mailed on Aug. 1, 2023, 27 pages.

* cited by examiner

210 — Determining target positioning data for placing at least one marking device based on inspection data of a gas GIS 220 — Determining an inspection analysis result based on the monitoring data and the inspection data 230 — Determining at least one re-inspection route based on the inspection analysis result

METHODS AND INTERNET OF THINGS SYSTEMS FOR JOINTLY PROCESSING SAFETY HAZARDS BASED ON SMART GAS GEOGRAPHIC INFORMATION SYSTEMS

CROSS-REFERENCE TO RELATED APPLICATION

This application claims priority of Chinese Patent Application No. 202310777530.6, filed on Jun. 29, 2023, the entire contents of which are incorporated herein by reference.

TECHNICAL FIELD

The present disclosure relates to the technical field of the Internet of Things, and in particular, to a method and an Internet of Things system for jointly processing a safety hazard based on a smart gas Geographic Information System (GIS).

BACKGROUND

With the development of the gas industry, the structure of urban gas pipeline networks has become increasingly complex, posing challenges to gas safety management. Utilizing Geographic Information System (GIS) technology to address gas hazards is an integral part of gas safety management. It is crucial to efficiently and effectively address gas hazards based on gas GIS.

In view of this, Chinese Patent Application No. CN109858126B discloses a method and system for warning and monitoring urban gas pipeline network safety based on settlement monitoring, which uses a multi-factor evaluation model and GIS spatial analysis technology to identify key areas of gas pipeline network settlement. Real-time collection of operational parameters at various settlement monitoring points, in conjunction with pipeline attribute parameters, enables the determination of the current safety risk level of each pipeline at the respective settlement monitoring point, facilitating timely prediction and efficient management of pipeline failures. However, this disclosure does not address the prediction of gas pipeline hazards nor the planning of inspection routes, resulting in subpar inspection quality.

Therefore, it is hoped to provide a method, an Internet of Things system, and a storage medium for jointly processing a safety hazard based on a smart gas GIS, so as to realize precise planning and management of gas inspection and improve the efficiency and quality of processing the hazard.

SUMMARY

One or more embodiments of the present disclosure provide a method for jointly processing a safety hazard based on a smart gas Geographic Information System (GIS), the method is executed by a smart gas pipeline network safety management platform of an Internet of Things system for jointly processing a safety hazard based on a smart gas GIS, including: determining target positioning data for placing at least one marking device based on inspection data of the gas GIS, wherein the at least one marking device is configured to obtain monitoring data of a target positioning area at at least one time point; determining an inspection analysis result based on the monitoring data and the inspection data; and determining at least one re-inspection route based on the inspection analysis result, wherein a feature of the re-inspection route includes at least one of a count of marking devices needing re-inspection, a sequence of re-inspection, or an attention level.

One or more embodiments of the present disclosure provide an Internet of Things system for jointly processing a safety hazard based on a smart gas GIS, including: a smart gas user platform, a smart gas service platform, a smart gas pipeline network safety management platform, a smart gas pipeline network device sensor network platform, and a smart gas pipeline network device object platform, wherein the smart gas user platform includes a plurality of smart gas user sub-platforms; the smart gas service platform includes a plurality of smart gas service sub-platforms; the smart gas pipeline network safety management platform includes a smart gas pipeline network safety management sub-platform and a smart gas data center; the smart gas pipeline network device sensor network platform is configured to interact with the smart gas data center and the smart gas pipeline network device object platform; the smart gas pipeline network device object platform is configured to obtain inspection data of the gas GIS; the smart gas pipeline network safety management platform is configured to obtain the inspection data of the gas GIS from the smart gas data center; determine the target positioning data for placing at least one marking device based on the inspection data of the gas GIS, the at least one marking device being configured to obtain the monitoring data of the target positioning area at at least one time point; determine the inspection analysis result based on the monitoring data and the inspection data; determine the at least one re-inspection route based on the inspection analysis result, a feature of the re-inspection route including at least one of a count of marking devices needing re-inspection, a sequence of re-inspection, or an attention level; and send the at least one re-inspection route to the smart gas service platform through the smart gas data center; and the smart gas service platform is configured to upload the at least one re-inspection route to the smart gas user platform.

One or more embodiments of the present disclosure provide a non-transitory computer-readable storage medium storing computer instructions, and when reading the computer instructions stored in the storage medium, a computer executes the method for jointly processing a safety hazard based on a smart gas GIS.

Through five communication-connected platforms, the Internet of Things system for jointly processing a safety hazard based on a smart gas GIS executes joint processing on a safety hazard in a gas pipeline, completing precise planning and management of gas inspection and reducing an occurrence of incidents of excessive-inspection and missed-inspection. By utilizing the marking device, a cost of manpower and time can be reduced, henceforth ensuring the efficiency and quality of the inspection.

BRIEF DESCRIPTION OF THE DRAWINGS

The present disclosure will be further illustrated by way of exemplary embodiments, which will be described in detail with the accompanying drawings. These embodiments are non-limiting, and in these embodiments, a same number indicates a same structure, wherein.

DETAILED DESCRIPTION

In order to more clearly illustrate technical solutions of the embodiments of the present disclosure, the following briefly introduces the drawings that need to be used in the description of the embodiments. Obviously, the accompanying drawings below are only some examples or embodiments of the present disclosure, and it is possible for ordinary technicians skilled in the art to apply the present disclosure to other similar scenarios according to these accompanying drawings without creative effort. Unless obviously obtained from the context or the context illustrates otherwise, the same numeral in the drawings refers to the same structure or operation.

It should be understood that the words "system", "device", "unit" and/or "module" as used herein is a manner for distinguishing different components, elements, parts, parts, or assemblies of different levels. However, the words may be replaced by other expressions if other words can achieve the same purpose.

As indicated in the present disclosure and claims, the terms "a", "an", "one" and/or "the" are not specific to the singular and may include the plural unless the context clearly indicates an exception. Generally speaking, the terms "comprising" and "including" only suggest the inclusion of clearly identified steps and elements, and these steps and elements do not constitute an exclusive list, and the method or device may also contain other steps or elements.

Flowcharts are used in the present disclosure to illustrate operations performed by the system according to the embodiment of the present disclosure. It should be understood that the preceding or following operations are not necessarily performed in the exact order. Instead, various steps may be processed in reverse order or simultaneously. At the same time, other operations can be added to these procedures, or a certain step or steps can be removed from these procedures.

An urban gas pipeline network is an intertwined network. Gas companies transport gas from a gas source to every household based on the network. Therefore, a timely prediction and effective management of a failure in a gas pipeline are important links related to a normal operation of various fields. Chinese Patent Application No. CN109858126B only uses GIS spatial analysis technology to identify key areas of gas pipeline network settlement and determine a current safety risk level of pipelines at each settlement monitoring point to realize the timely prediction and effective management of the failure in the gas pipeline, but it fails to predict a safety hazard, and does not consider planning an inspection route. Therefore, in some embodiments of the present disclosure, based on monitoring data of a marking device and inspection data of a gas GIS, an inspection analysis result is automatically determined, and then a re-inspection route is determined, realizing precise planning and management of a gas inspection and reduce incidents of excessive-inspection and missing-inspection. By using the marking device, a cost of manpower and time can be reduced, and the efficiency and quality of the gas inspection can be guaranteed.

Figure 1:
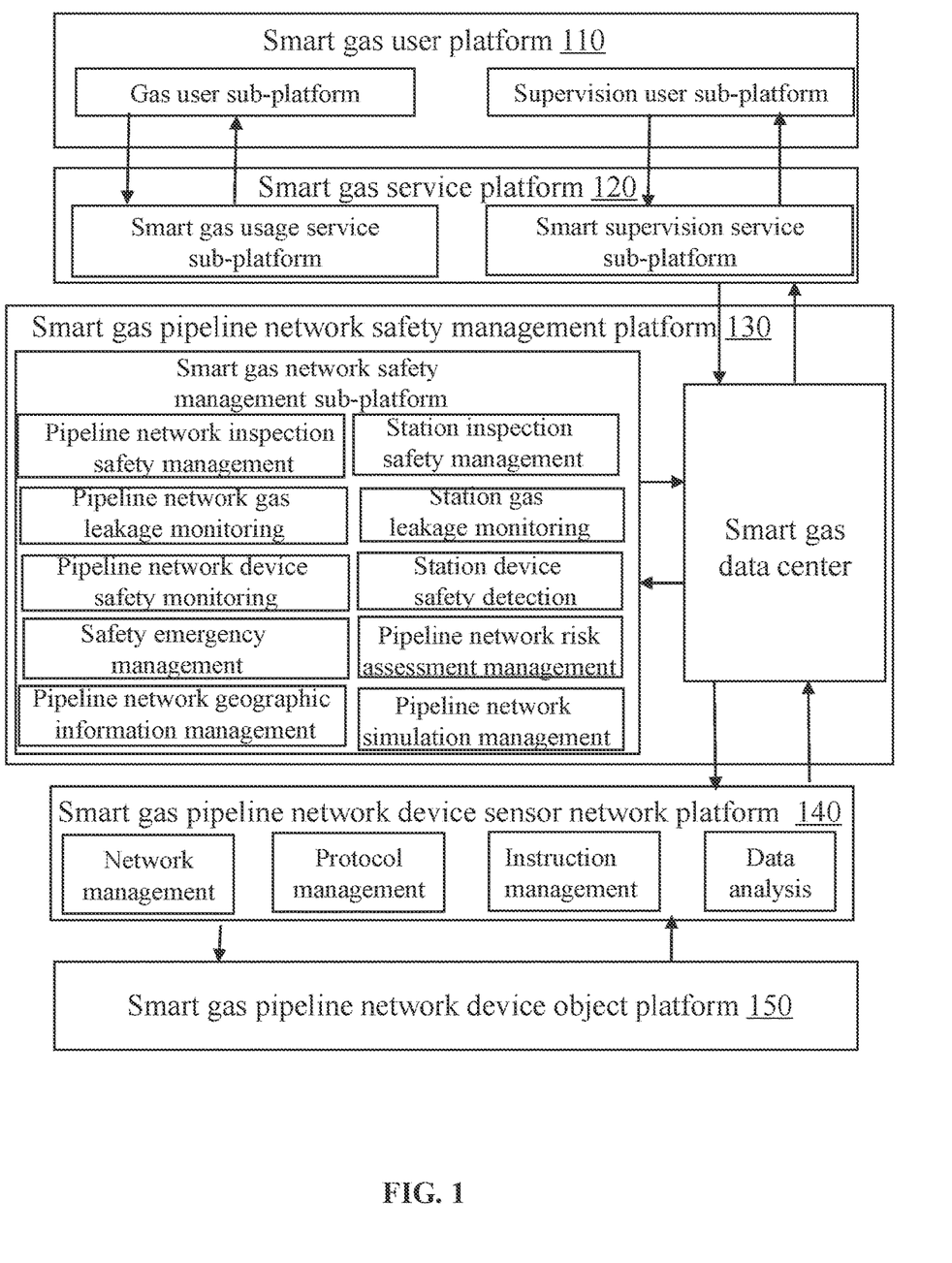
FIG. 1 is a structural diagram illustrating an exemplary Internet of Things system for jointly processing a safety hazard based on a smart gas GIS according to some embodiments of the present disclosure.

FIG. 1 is a structural diagram illustrating an exemplary Internet of Things system for jointly processing a safety hazard based on a smart gas GIS according to some embodiments of the present disclosure. As shown in FIG. 1, the Internet of Things system for jointly processing a safety hazard based on a smart gas GIS may include a smart gas user platform 110, a smart gas service platform 120, a smart gas pipeline network safety management platform 130, and a smart gas pipeline network device sensor network platform 140, and a smart gas pipeline network device object platform 150.

The smart gas user platform 110 may be a platform for interacting with a user. In some embodiments, the smart gas user platform 110 may be configured as a terminal device.

In some embodiments, the smart gas user platform 110 may include a gas user sub-platform and a supervision user sub-platform.

The gas user sub-platform may be used to provide the gas user with relevant data on a gas usage and a solution to a gas problem. The gas user may be an industrial gas user, a commercial gas user, an ordinary gas user, etc.

The supervision user sub-platform may be configured to supervise an operation of the entire Internet of Things system 100 for jointly processing a safety hazard based on a smart gas GIS. The supervision user may be personnel of a safety management department.

In some embodiments, a smart supervision service sub-platform may perform a data interaction with the supervision user sub-platform, and send information related to gas pipeline network supervision to the supervision user.

The smart gas service platform 120 may be a platform for communicating a user's need and control information. The smart gas service platform 120 may obtain monitoring data or the like from the smart gas pipeline network safety management platform 130 (e.g., a smart gas data center), and send the monitoring data or the like to the smart gas user platform 110.

In some embodiments, the smart gas service platform 120 may include a smart gas usage service sub-platform and the smart supervision service sub-platform.

The smart gas usage service sub-platform may be a platform configured to provide a gas service for the gas user.

The smart supervision service sub-platform may be a platform configured to provide a supervision service for the supervision user.

In some embodiments, the smart gas service platform 120 may be configured to upload at least one re-inspection route to the smart gas user platform 110.

The smart gas pipeline network safety management platform 130 may be a platform configured to coordinate and integrate connection and collaboration between various functional platforms.

In some embodiments, the smart gas network safety management platform 130 may include a smart gas pipeline network safety management sub-platform and the smart gas data center.

The smart gas pipeline network safety management sub-platform may be configured to manage the Internet of Things system 100 for jointly processing a safety hazard based on a smart gas GIS. In some embodiments, the smart gas pipeline network safety management sub-platform may include, but is not limited to, a pipeline network inspection safety management module, a station inspection safety management module, a pipeline network gas leakage monitoring module, a station gas leakage monitoring module, a pipeline network device safety monitoring module, a station device safety detection module, a safety emergency management module, a pipeline network risk assessment management module, a pipeline network geographic information management module, a pipeline network simulation management module. The smart gas pipeline network safety management sub-platform may analyze and process data related to the Internet of Things system 100 for jointly processing a safety hazard based on a smart gas GIS through the aforementioned management modules.

The smart gas data center may be configured to store and manage all operation information of the Internet of Things system 100 for jointly processing a safety hazard based on a smart gas GIS. In some embodiments, the smart gas data center may be configured as a storage device for storing data related to the joint processing of the safety hazard based on the smart gas GIS. For example, the data may be monitoring data.

In some embodiments, the smart gas pipeline network safety management platform 130 may perform an information interaction with the smart gas service platform 120 and the smart gas pipeline network device sensor network platform 140 respectively through the smart gas data center. For example, the smart gas data center may send data related to the Internet of Things system 100 for jointly processing a safety hazard based on a smart gas GIS to the smart gas service platform 120. As another example, the smart gas data center may send an instruction to obtain data related to the Internet of Things system 100 for jointly processing a safety hazard based on a smart gas GIS to the smart gas pipeline network device sensor network platform 140 to obtain data related to the safety of a gas pipeline network device.

The smart gas pipeline network device sensor network platform 140 may be a functional platform for managing sensor communication. In some embodiments, the smart gas pipeline network device sensor network platform 140 may realize functions of sensor communication of perception information and sensor communication of control information.

In some embodiments, the smart gas pipeline network device sensor network platform 140 may be configured for network management, protocol management, instruction management, and data analysis.

In some embodiments, the smart gas pipeline network device sensor network platform 140 may be configured to interact with the smart gas data center and the smart gas pipeline network device object platform 150.

The smart gas pipeline network device object platform 150 may be a functional platform for generating the perception information and executing the control information. In some embodiments, the smart gas pipeline network device object platform 150 may be configured as various types of gas pipeline network devices and monitoring devices. The monitoring device may include a gas flow device, an image obtaining device, a temperature and humidity sensor, a pressure sensor, a gas leakage alarm, etc.

In some embodiments, the smart gas pipeline network device object platform 150 may be configured to obtain inspection data of a gas GIS.

Figure 2:
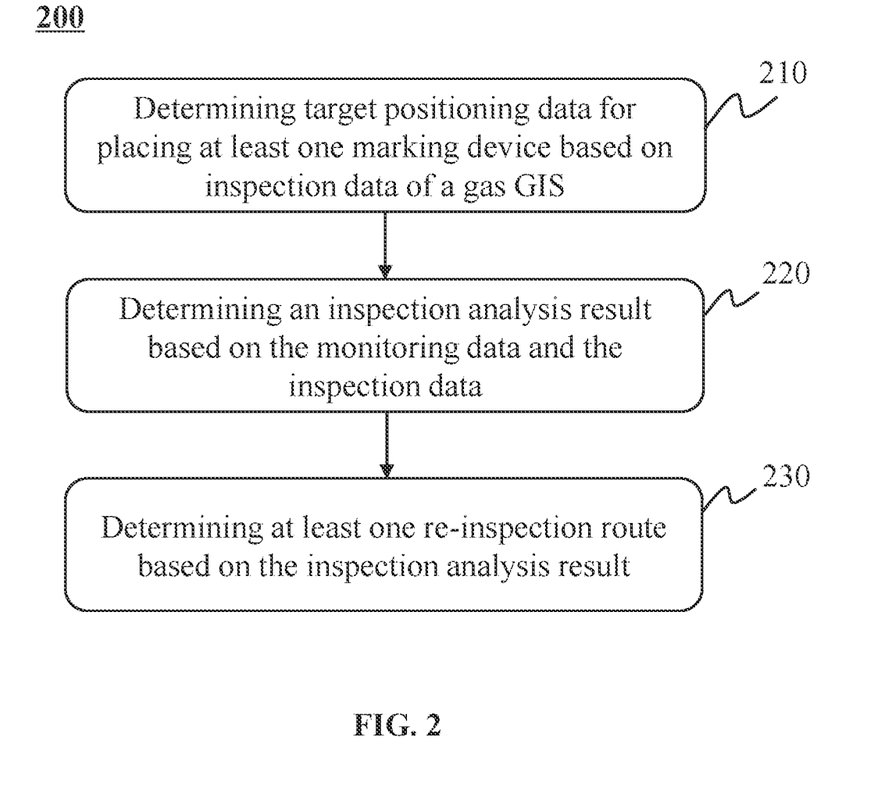
FIG. 2 is a flowchart illustrating an exemplary process for jointly processing a safety hazard based on a smart gas GIS according to some embodiments of the present disclosure.

For more details about the inspection data, monitoring data, inspection analysis result, etc., please refer to the relevant descriptions in other parts of the present disclosure (e.g., FIG. 2).

In some embodiments of the present disclosure, the Internet of Things system 100 for jointly processing a safety hazard based on the smart gas GIS may form a closed loop of information operation between the smart gas pipeline network device object platform and the smart gas user platform, and be managed and coordinated by the smart gas management platform to realize the informatization and intellectualization of the management of the safety hazard of the gas GIS.

It should be noted that the above description of the Internet of Things system 100 for jointly processing a safety hazard based on the smart gas GIS and its components is only for convenience of description and does not limit the present disclosure to the scope of the embodiments. It can be understood that for those skilled in the art, after understanding the principle of the Internet of Things system, it is possible to combine various components arbitrarily or form a sub-system to connect with other components without departing from this principle.

FIG. 2 is a flowchart illustrating an exemplary process for jointly processing a safety hazard based on a smart gas GIS according to some embodiments of the present disclosure. As shown in FIG. 2, a process 200 may include the following steps. In some embodiments, the process 200 may be executed by the smart gas pipeline network safety management platform 130.

Step 210, determining target positioning data for placing at least one marking device based on inspection data of a gas GIS.

The gas GIS is a gas geographic information system (GIS), which may provide required gas pipeline network information for the smart gas pipeline network safety management platform 130, so as to realize dynamic updating, querying, and statistics of the gas pipeline network information, a pipeline network operation inspection, and other functions.

The inspection data refers to data obtained during a process for pipeline network inspection. For example, the inspection data may include a geographical location or distance of a gas pipeline network, a building condition, and a count of residents. In some embodiments, the smart gas pipeline network safety management platform may obtain the inspection data input by an inspector from an object platform terminal of the smart gas pipeline network device object platform based on the smart gas pipeline network device sensor network platform or the inspection data obtained by the smart gas pipeline network device object platform from the gas GIS.

The marking device refers to a device configured to obtain inspection data of a specific location (e.g., a target positioning area, or a hazard point). For example, the marking device includes a gas concentration detector, a vibration noise measurement instrument, an image obtaining device, or the like.

The target positioning area refers to a hazard point or other areas where the gas pipeline network needs to be monitored in a focused manner.

The monitoring data refers to gas-related data monitored by the marking device. For example, the monitoring data may be a gas concentration, an abnormal sound vibration, regularly obtained image data, or the like.

The abnormal sound vibration refers to a sound vibration caused by an abnormal gas pipeline or device.

The regularly obtained image data refers to an image related to the gas pipeline network collected at a preset time interval. The preset time interval may be set by default in a system.

The target positioning data refers to a location of a gas pipeline network where may exist a gas hazard. The target positioning data may be expressed in a set form, for example, (a target positioning point 1, a target positioning point 2, . . . , and a target positioning point n).

In some embodiments, the smart gas pipeline network safety management platform may determine the target positioning data for placing at least one marking device in multiple ways based on the inspection data of the gas GIS. For example, the target positioning data is formed by placing a plurality of marking devices randomly at a preset distance interval and obtaining location information of the plurality of marking devices. The preset distance interval may be set by default in the system.

In some embodiments, the smart gas pipeline network safety management platform may predict a level of hazard of at least one uninspected area, and determine the target positioning data for placing the at least one marking device. For more details, please refer to FIG. 3 and its related descriptions.

Step 220, determining an inspection analysis result based on the monitoring data and the inspection data.

The inspection analysis result refers to a result of analyzing and processing relevant data in a process of inspection. For example, the inspection analysis result may include determining whether there is a hazard and a level of hazard.

In some embodiments, the smart gas pipeline network safety management platform may determine the inspection analysis result in various ways. For example, the smart gas pipeline network safety management platform analyzes and processes the monitoring data, and combines the gas inspection data to comprehensively determine the inspection analysis result. For example, based on the monitoring data, it is judged whether the gas concentration exceeds a threshold, whether there is an abnormal sound vibration, and whether there is an abnormality in the regularly obtained image data, etc. Then monitoring data and/or inspection analysis result corresponding to gas inspection data including one of the aforementioned abnormalities is determined as the monitoring data and/or inspection analysis result corresponding to gas inspection data including a hidden hazard. When there is a hazard and a gas pipeline corresponding to a location of the hazard in the inspection data is damaged or a component is lost, it is determined that the level of hazard of the location of the hazard is high.

In some embodiments, the inspection analysis result may also include at least one of a technical category, whether a re-inspection is needed, or a re-inspection manner. In some embodiments, the smart gas pipeline network safety management platform may determine a monitoring feature based on the monitoring data; and determine the inspection analysis result based on the monitoring feature and the inspection data.

The monitoring feature may include a change range, a sound similarity, an image similarity, etc., of the monitoring data (e.g., the gas concentration) per unit time (e.g., a time within 1 s).

The sound similarity refers to a similarity between the abnormal sound vibration and a preset sound vibration, and the image similarity refers to a similarity between a regularly obtained image and a preset image of a hazard. The preset sound vibration refers to a sound vibration of a historical gas pipeline network or device when different abnormalities occur. The preset sound vibration and the preset image of the hazard may be obtained based on historical monitoring data.

In some embodiments, the smart gas pipeline network safety management platform may take a difference between current monitoring data (e.g., the gas concentration) and initial monitoring data (e.g., an initial gas concentration), and divide the difference by time to obtain the change range of the monitoring data per unit time. The smart gas pipeline network safety management platform may determine the sound similarity between the abnormal sound vibration and the preset sound vibration through a sound model; and determine the image similarity between the regularly obtained image and the preset image of the hazard through an image recognition model.

The technical category refers to a problem type of the gas hazard. For example, the technical category includes a pipeline problem, a valve problem, a non-metallic component aging problem, a corrosion problem, etc. In some embodiments, the smart gas pipeline network safety management platform may determine the technical category by obtaining record information uploaded by the inspector in the smart gas pipeline network device object platform. The record information may include an inspection time, an inspection positioning point, a specific technical category, etc.

In some embodiments, the smart gas pipeline network safety management platform may predict a change trend of the monitoring data at a future time point based on prior knowledge, the monitoring feature, and the inspection data; and determine monitoring data at the future time point (e.g., 7 days later) based on the change trend, and judge whether the monitoring data exceeds a re-inspection threshold. If the monitoring data exceeds the re-inspection threshold, re-inspection is needed.

The re-inspection manner includes an online re-inspection, an offline re-inspection, and an online-offline linkage re-inspection. In some embodiments, the smart gas pipeline network safety management platform may determine the re-inspection manner based on the change range of the monitoring data per unit time. For example, if the change range exceeds a preset range threshold, the online-offline linkage re-inspection may be performed. If the change range does not exceed the preset range threshold, the offline re-inspection may be performed.

In some embodiments, the smart gas pipeline network safety management platform may determine the inspection analysis result by processing the monitoring feature and the inspection data based on an inspection model.

The inspection analysis result output by the inspection model may be expressed in a vector form as (the technical category, whether the re-inspection is needed, the re-inspection manner). For example, (1, 1, 2) may represent (the pipeline problem, the re-inspection is needed, the offline re-inspection).

The inspection model may be a machine learning model, e.g., a convolutional neural network (CNN).

In some embodiments, the inspection model may be trained and obtained through a plurality of first training samples with a first label.

In some embodiments, the first training sample may be obtained at least based on historical data, including a sample monitoring feature and sample inspection data. The first label may be a historical actual inspection result and may be determined based on the historical data.

In some embodiments of the present disclosure, by processing the monitoring feature and the inspection data through the model, the inspection analysis result is more accurate, which is beneficial to improving the efficiency of the gas inspection.

A traditional determination of hazard based on the inspection data may have certain limitations. Sometimes it can only detect a more intuitive gas hazard, but it is not easy to find and identify a hidden hazard. In some embodiments of the present disclosure, by setting the marking device to obtain the monitoring data continuously and intuitively, it is convenient to determine the monitoring feature, and further analyze and evaluate the positioning points in combination with the inspection data, so as to improve the accuracy and efficiency of gas hidden hazard identification.

Step 230: determining at least one re-inspection route based on the inspection analysis result.

The re-inspection route refers to a route of re-inspection. The re-inspection route may be composed of target positioning points of marking devices needing re-inspection arranged in a certain order.

In some embodiments, a feature of the re-inspection route may include at least one of a count of marking devices needing re-inspection, a sequence of re-inspection, or an attention level. The attention level may be determined by a level of hazard of a pipeline network where the marking device is located and a confidence level of the level of hazard. The higher the level of hazard and the confidence level of the level of hazard, the higher the attention level.

The level of hazard may be determined based on the monitoring feature. For example, the smart gas pipeline network safety management platform may determine the level of hazard by looking up a second preset relationship table including a corresponding relationship between the monitoring feature and the level of hazard. The confidence level of the level of hazard may be determined based on the monitoring data and the inspection data. For example, if the monitoring data shows that there is a 100% probability of the existence of a hazard at a certain level, or if the presence of a hazard is determined with 100% certainty based solely on the inspection data, then the confidence level of the level of hazard is 100%. As another example, when monitoring data and inspection data that are the same as or similar to the current monitoring data and inspection data appear in the historical data, the confidence level is calculated through dividing a data amount in the final historical data where the pipeline network where the marking device is located is judged to include a hazard divided by a total amount of the historical data.

In some embodiments, the smart gas pipeline network safety management platform may determine the at least one re-inspection route in various ways based on the inspection analysis result. For example, the smart gas pipeline network safety management platform may randomly arrange target positioning points needing re-inspection, generate a plurality of candidate re-inspection routes, and select a candidate re-inspection route with a shortest re-inspection distance as a target re-inspection route.

In some embodiments, the smart gas pipeline network safety management platform may determine the re-inspection route based on a re-inspection set. For more details, please refer to FIG. 4 and related descriptions.

In some embodiments of the present disclosure, the smart gas pipeline network safety management platform uses the marking device to continuously obtain the monitoring data, combines the inspection data of the gas GIS, accurately and efficiently determines the inspection analysis result, and then conducts a targeted re-inspection, so as to realize refined planning and management of gas inspection, reduce the cost of manpower and time, and ensure the efficiency and quality of the inspection.

It should be noted that the above description about the process 200 is only for illustration and description, and does not limit the scope of application of the present disclosure. For those skilled in the art, various modifications and changes may be made to the process 200 under the guidance of the present disclosure. However, such modifications and changes are still within the scope of the present disclosure.

In some embodiments, determining the target positioning data for placing at least one marking device based on the inspection data of the gas GIS may include: predicting the level of hazard of the at least one uninspected area based on the inspection data; and determining the target positioning data for placing at least one marking device based on the level of hazard of the at least one uninspected area.

The uninspected area refers to an area that has not been inspected by the inspector. In some embodiments, the uninspected area may be divided and determined according to an inspection record of the gas pipeline network.

The level of hazard refers to a severity of the hazard, which may include an estimated amount of target positioning data of the uninspected area. The larger the estimated amount, the higher the level of hazard. For more information about the target positioning data, please refer to FIG. 2 and related descriptions.

In some embodiments, the smart gas pipeline network safety management platform may predict the level of hazard of the at least one uninspected area based on the inspection data in various ways. For example, inspection data of other areas that are at the same or close to a location of the uninspected area and has a same or similar time elapsed since a historical hazard has been eliminated is obtained, and a level of hazard corresponding to the inspection data is determined as the level of hazard of the uninspected area.

In some embodiments of the present disclosure, by using the inspection data to predict the level of hazard of the uninspected area, and then determining the target positioning data, an application of the marking device can be more in line with an actual inspection requirement.

In some embodiments, the smart gas pipeline network safety management platform may use a hazard model to process the inspection data and data related to eliminating hazards in history, and determine the level of hazard of the at least one uninspected area and the confidence level of the level of hazard.

The hazard model may be a machine learning model, for example, a deep neural network (DNN) or the like.

The data related to eliminating hazards in history may include a time elapsed from a moment of a last hazard that has been eliminated to a current moment.

In some embodiments, the hazard model may be trained and obtained through a plurality of second training samples with a second label. A training manner may include but is not limited to a gradient descent algorithm or the like.

In some embodiments, the second training sample includes sample inspection data and sample interval time of eliminating hazards in the historical data. The second label may be an actual level of hazard corresponding to the second training sample. The second label may be obtained by manual labeling based on historical actual data.

In some embodiments of the present disclosure, by referring to the model, a determination of the level of hazard of the uninspected area and the confidence level of the level of hazard is more accurate, so reliable data support is provided for a subsequent determination of the target positioning data.

In some embodiments, the smart gas pipeline network safety management platform may determine the target positioning data for placing at least one marking device through various manners based on the level of hazard of the at least one uninspected area. For example, based on the level of hazard, a location with a high level of hazard is preferentially determined as the target positioning data.

In some embodiments, the smart gas pipeline network safety management platform may further adjust the target positioning data. For example, the smart gas pipeline network safety management platform may cancel target positioning data with a relatively close distance based on a preset interval distance; consider how to set up the target positioning data so that the marking device can identify the hazard with a higher accuracy; and consider to determine an unidentified hidden hazard point as the target positioning data, etc. For more content about the hidden hazard point, please see below.

In some embodiments, the smart gas pipeline network safety management platform may determine positioning data of the unidentified hidden hazard point in the historical data as the target positioning data for placing at least one marking device.

The historical data refers to relevant data generated during a process of historical inspection, such as a historical inspection record, historical inspection data, etc.

A historical hidden hazard point refers to a hidden hazard point that has not been found in historical inspection but has a gas hazard or a gas problem later. The hidden hazard point refers to a positioning point where a marking device is not placed but is affected by a hazard at a location of a marking device or an actual hazard positioning point that indirectly causes the hazard at the location of the marking device.

In some embodiments of the present disclosure, it is considered that there are hidden hazard points in the historical data that are not recognized by the marking device, and it is also considered that there is a greater probability that the hidden hazard points have gas hazards, which helps to reduce the leakage of detections and facilitates the improvement of the accuracy of the identification of the gas hazards.

Figure 3:
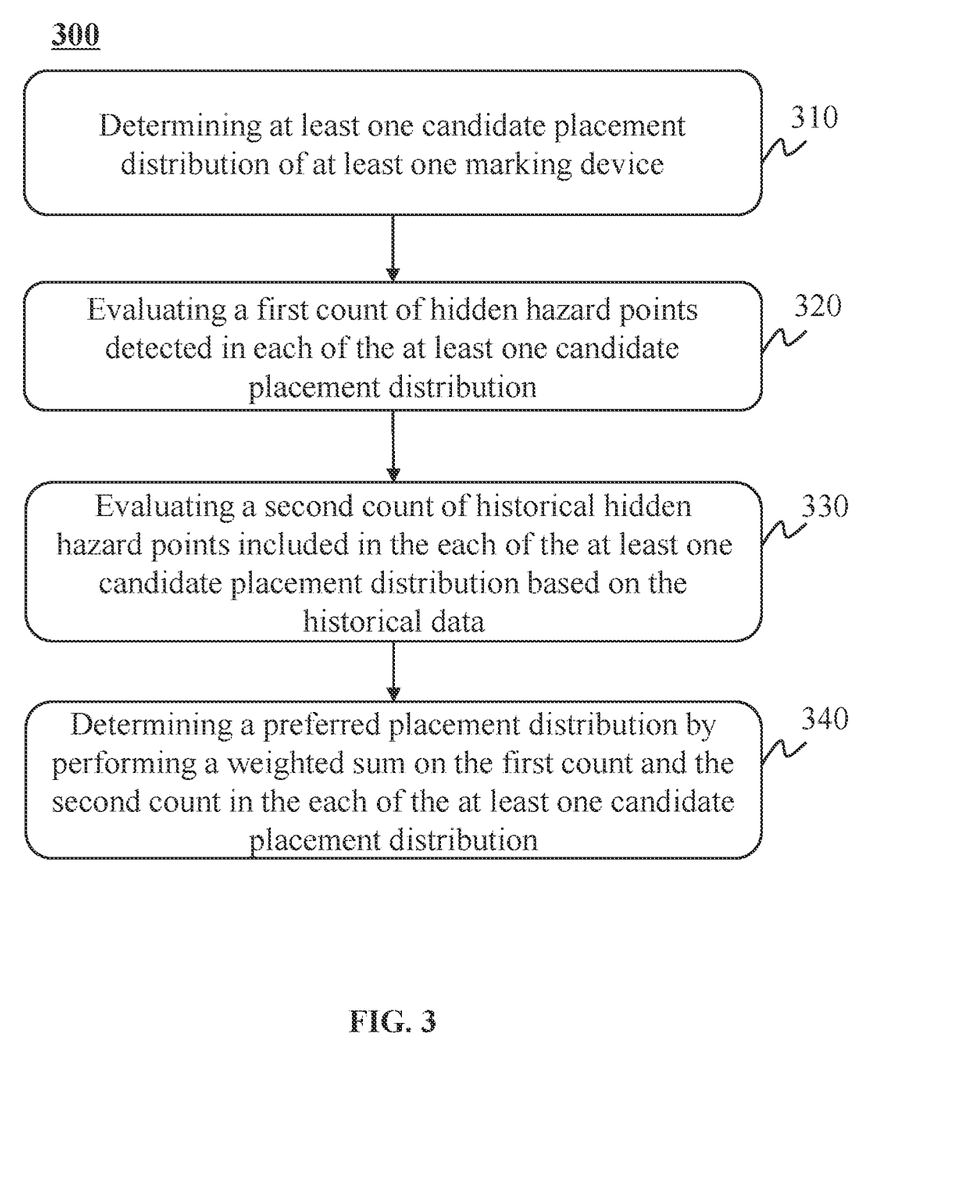
FIG. 3 is a flowchart illustrating an exemplary process for determining target positioning data of a marking device according to some embodiments of the present disclosure.

FIG. 3 is a flowchart illustrating an exemplary process for determining target positioning data for placing at least one marking device according to some embodiments of the present disclosure. As shown in FIG. 3, a process 300 may include steps 310-340. In some embodiments, the process 300 may be executed by the smart gas safety management platform 130.

Step 310, determining at least one candidate placement distribution of the at least one marking device.

The candidate placement distribution refers to a candidate scheme for a placement location and a distribution of the at least one marking device. In some embodiments, the candidate placement distribution may include at least one placement location of the at least one marking device.

In some embodiments, the smart gas pipeline network safety management platform may randomly generate a plurality of candidate placement distributions of marking devices according to a preset placement condition based on levels of hazard of a plurality of uninspected areas and confidence levels of the level of hazards. The preset placement condition may include that the marking devices are preferentially placed in locations with a high level of hazard and a high confidence level, a distance between any two marking devices is greater than a shortest distance threshold, and a total count of marking devices within a preset range is greater than a minimum count threshold and smaller than a maximum count threshold. The preset range, the shortest distance threshold, the minimum count threshold, and the maximum count threshold may all be set based on experience or set by default of the system.

Step 320, evaluating a first count of hidden hazard points detected in each of the at least one candidate placement distribution.

The first count refers to a total count of hidden hazard points predicted to be detected after the marking device is placed in the each candidate placement distribution and may be represented by $n_1$.

In some embodiments, the smart gas pipeline network safety management platform may determine a count of edges including a hidden hazard point in a device diagram as the first count. For more content about the device diagram and the count of edges including a hidden hazard point, please refer to the related description in FIG. 5.

Step 330, evaluating a second count of historical hidden hazard points included in the each of the at least one candidate placement distribution based on historical data.

In some embodiments, the smart gas pipeline network safety management platform may determine a count of hidden hazard points in the historical data as the second count. For example, the second count is determined through a weighted sum. For example, the second count is represented by $n_2$, which may be determined by the following formula (1):

$$n_2 = m_1 \times a_1 + m_2 \times a_2 + \ldots + m_i \times a_i, \quad (1)$$

where $a_1, a_2, \ldots,$ and $a_i$ respectively denote a count of occurrences of historical hidden hazard point 1, historical hidden hazard point 2, ..., and historical hidden hazard point i corresponding to a certain candidate placement distribution; $m_1, m_2, \ldots,$ and $m_i$ denote weights determined based on the count of occurrences of historical hidden hazard point 1, historical hidden hazard point 2, ..., and historical hidden hazard point i, the weight is positively correlated with the count of occurrences, $m_1 + m_2 + \ldots + m_i = 1$.

Step 340, determining a preferred placement distribution by performing a weighted sum on the first count and the second count in the each of the at least one candidate placement distribution.

In some embodiments, the smart gas pipeline network safety management platform may perform a weighted sum on the first count and the second count in the each of the at least one candidate placement distribution and determine a candidate placement distribution including a largest weighted sum result as the preferred placement distribution.

For example, the weighted sum result is represented as P, which is realized by the following formula (2):

$$P = k_1 \times n_1 + k_2 \times n_2, \quad (2)$$

where $n_1$ and $n_2$ denote the first count and the second count, respectively, $k_1$ denotes the weight corresponding to the first count, and $k_2$ denotes the weight corresponding to the second count.

In some embodiments, the smart gas pipeline network safety management platform may determine a placement location of each marking device in the preferred placement distribution as the target positioning data.

In some embodiments, the weight $k_1$ of the first count may be determined through presetting, and the weight $k_2$ of the second count may be related to a concentration level of the historical hidden hazard point. In some embodiments, the greater the concentration level of the historical hidden hazard point, the greater the weight $k_2$ of the second count.

The concentration level refers to a degree of concentration of historical hidden hazard points. In some embodiments, the smart gas pipeline network safety management platform may make differences between a count of occurrences of each historical hidden hazard point and counts of occurrences of other historical hidden hazard points that are smaller than the count of occurrences of the historical hidden hazard point in the historical data, and then sum the differences to obtain the concentration level. For example, there are 5 historical hidden hazard points in the historical data, and counts of occurrences corresponding to the historical hidden hazard points are represented as a vector: (1, 3, 20, 5, 7), then the concentration level of the historical hidden hazard points is 84 ((20−7)+(20−5)+(20−3)+(20−1)+(7−5)+(7−3)+(7−1)+(5−3)+(5−1)+(3−1)).

In some embodiments of the present disclosure, by determining the preferred placement distribution by evaluating the first count of hidden hazard points and the second count of historical hidden hazard points in the candidate placement distribution, multiple factors can be integrated to make a final placement distribution more reasonable and accurate, and can more accurately predict the hidden hazard point. The weight of the weighted sum is determined by quoting the concentration level of the historical hidden hazard point, taking into account that the larger the concentration level indicates that the current hidden hazard point is more likely to occur in the historical hidden hazard points, so that the placement of the marking device when determining the preferred placement points is more biased towards the historical hidden hazard points, and the reasonableness of the placement of the marking device and the accuracy of the disposal of the hazard are improved.

Figure 4:
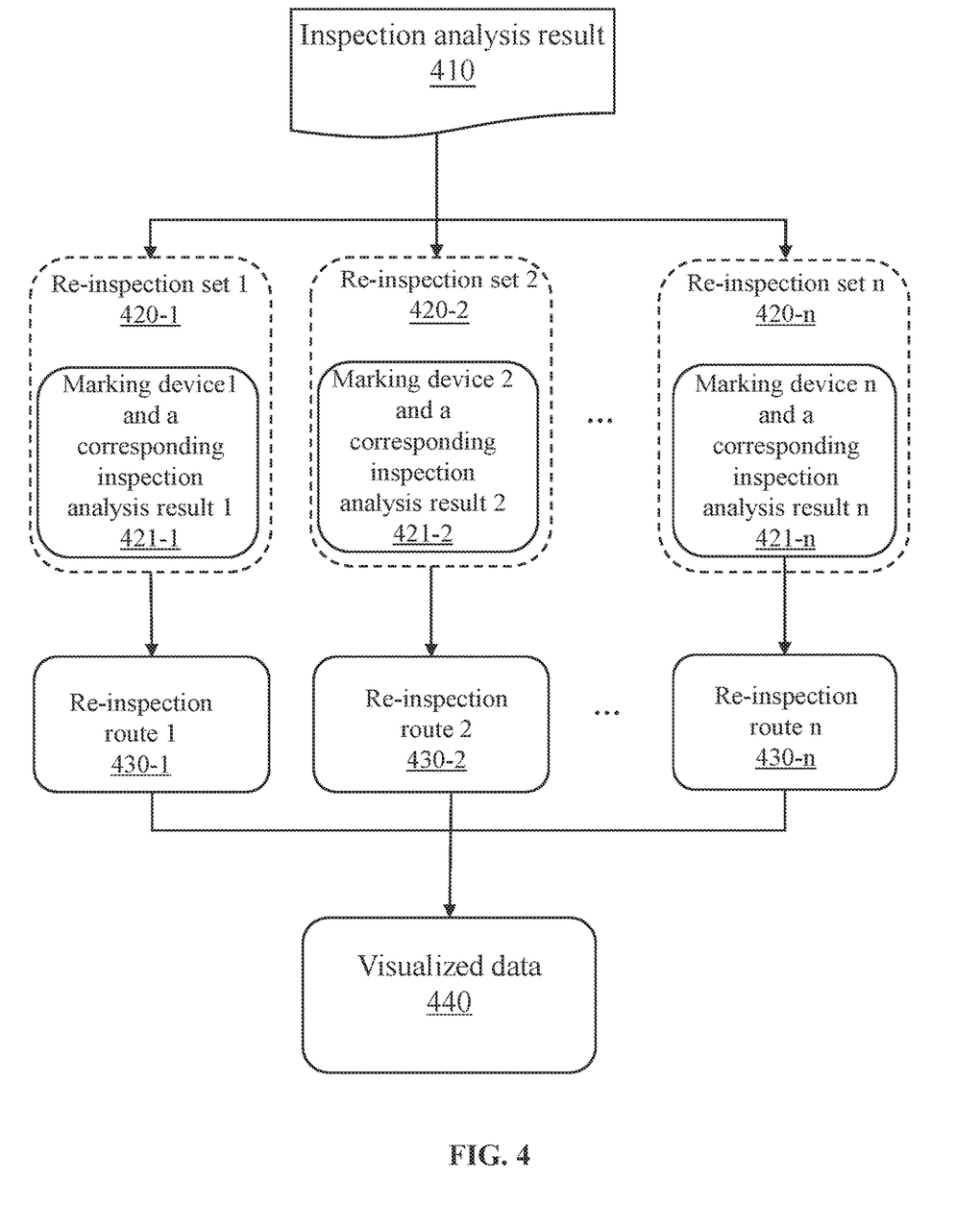
FIG. 4 is a schematic diagram illustrating an exemplary process for determining a re-inspection route based on an inspection analysis result according to some embodiments of the present disclosure.

FIG. 4 is a schematic diagram illustrating an exemplary process for determining a re-inspection route based on an inspection analysis result according to some embodiments of the present disclosure.

In some embodiments, a smart gas pipeline network safety management platform may determine at least one re-inspection set (e.g., 420-1, 420-2, . . . , and 420-*n*) based on an inspection analysis result 410; determine at least one re-inspection route (e.g., 430-1, 430-2, . . . , and 430-*n*) based on the at least one re-inspection set, and display visualized data 440 on a GIS map.

The re-inspection set refers to a collection of target positioning data needing re-inspection. In some embodiments, as shown in FIG. 4, each re-inspection set (e.g., 420-1, 420-2, . . . , 420-*n*) may at least include a marking device and an analysis result (e.g., 421-1, 421-2, . . . , 421-*n*) corresponding to the marking device.

In some embodiments, the smart gas pipeline network safety management platform may determine the at least one re-inspection set in various ways based on the inspection analysis result. For example, the smart gas pipeline network safety management platform may determine the at least one re-inspection set by looking up a third preset relationship table including a corresponding relationship between the inspection analysis result and the re-inspection set. The third preset relationship table may be formed based on a historical inspection result and a historical re-inspection set composed of positioning data of a determined marking device after each historical inspection.

In some embodiments, the smart gas pipeline network safety management platform may determine the at least one re-inspection set (e.g., 420-1, 420-2, . . . , and 420-*n*) by clustering target positioning data based on the inspection analysis result 410.

A clustering algorithm may include but is not limited to, K-Means clustering, Gaussian clustering, or the like.

Through clustering, target positioning data with a same or similar inspection analysis result may be grouped into a set to form a plurality of clustering results, that is, a plurality of clusters.

In some embodiments, the smart gas pipeline network safety management platform may determine target positioning data in a clustering result (cluster) as the re-inspection set. Each re-inspection set includes at least one marking device and an inspection analysis result of an area where the marking device is located.

In some embodiments of the present disclosure, based on the inspection analysis result, similar target positioning data can be quickly determined and classified into a same set through clustering, which is beneficial to efficiently determine the re-inspection set.

The GIS map refers to a vector map that can be freely interactively operated under the support of a computer system. It has spatial topological relationships, displays real geographical locations, and has a GPS positioning function.

The visualized data refers to structured or unstructured data presented graphically. For example, the visualized data includes different marks of different target positioning points, a re-inspection route mark, inspection data of a gas GIS and other data that are displayed visually.

In some embodiments, the smart gas pipeline network safety management platform may determine the at least one re-inspection route in various ways based on the at least one re-inspection set. For example, the smart gas pipeline network safety management platform may randomly sort target positioning data in the re-inspection set to generate a plurality of candidate re-inspection routes; select a candidate re-inspection route with a smallest sum of inspection distances from the plurality of candidate re-inspection routes as a target re-inspection route.

In some embodiments, after the re-inspection route is determined, the smart gas pipeline network safety management platform may display information of different target positioning data of the re-inspection route on the GIS map, for example, a mark of the target positioning data, a track of the target re-inspection route, inspection data of the gas GIS of each target positioning data, etc. A user may view corresponding information by clicking on the mark of the target positioning data.

In some embodiments, the re-inspection set also includes a hidden hazard point, and the smart gas pipeline network safety management platform may construct a device diagram based on the marking device; determine at least one hidden hazard point based on the device diagram, and update the visualized data on the GIS map; and update the at least one re-inspection set and/or the re-inspection route based on location information of the at least one hidden hazard point.

The device diagram refers to a graph structure that represents a connection relationship, a distribution and related information of a plurality of marking devices. In some embodiments, the smart gas pipeline network safety management platform may construct the device diagram based on target positioning points of marking devices and a gas pipeline between the target positioning points.

In some embodiments, the device diagram may designate a target positioning point of at least one marking device as a node and the gas pipeline between the target positioning point as an edge. The target positioning point is a location of a marking device needed to be placed for a later prediction.

A node feature of the device diagram includes whether there is the marking device, monitoring data of the marking device, the inspection data of the gas GIS, the inspection analysis result, etc.

An edge feature of the device diagram includes a straight-line distance between nodes, whether a historical unidentified hidden hazard is included, a count of historical unidentified hidden hazard points, etc.

In some embodiments, the smart gas pipeline network safety management platform may determine a count of edges including a hidden hazard point in the device diagram as a first count. For more content about the first count, please refer to the related description of FIG. 3.

In some embodiments of the present disclosure, by constructing a device diagram, the connection relationship, the distribution, and related gas data information of a plurality of marking devices can be clearly visualized.

Figure 5:
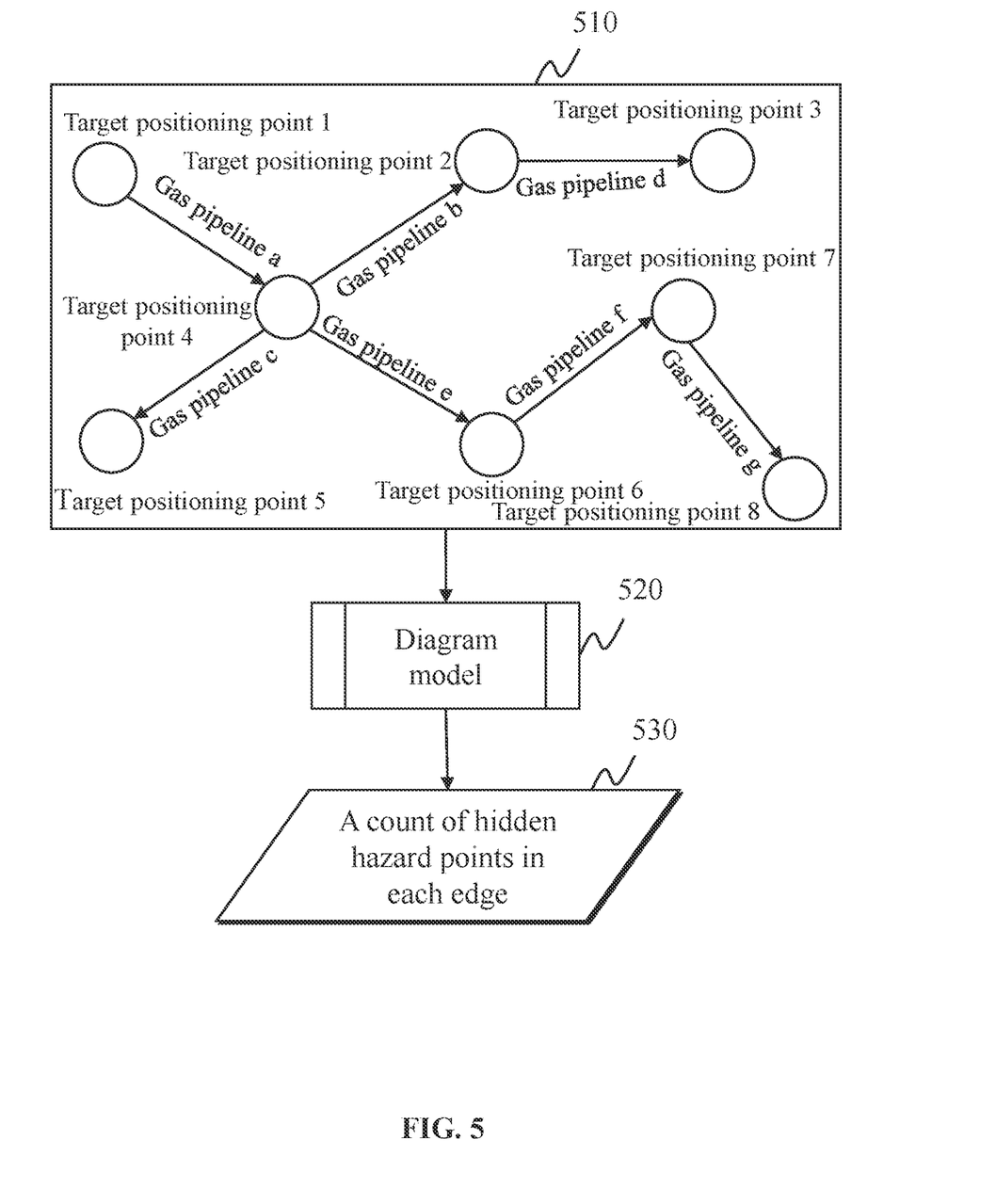
FIG. 5 is a schematic diagram illustrating an exemplary process for determining a re-inspection route based on a device diagram according to some embodiments of the present disclosure.

FIG. 5 is a schematic diagram illustrating an exemplary process for determining a re-inspection route based on a device diagram according to some embodiments of the present disclosure.

In some embodiments, a smart gas pipeline network safety management platform may determine at least one hidden hazard point in various ways based on the device diagram. For example, the smart gas pipeline network safety management platform may retrieve data of any two nodes and an edge between the two nodes, and determine whether there is a hidden hazard point in a gas pipeline corresponding to the edge through a preset algorithm.

In some embodiments, the following formula (3) may be used to determine whether there is a hidden hazard point in a certain edge of the device diagram through a preset algorithm:

$$w=(b_1+c_1+d_1)\times h_1+(b_2+c_2+d_2)\times h_2+e_{12} \quad (3)$$

where w denotes a total hidden hazard score, $b_1$, $c_1$, and $d_1$ denote a gas concentration score, an abnormal sound score, and an image score of a node 1, respectively, $b_2$, $c_2$, and $d_2$ denote a gas concentration score, an abnormal sound score, and an image score of a node 2, respectively, $h_1$ and $h_2$ denote preset weights of the node 1 and the node 2 respectively, and $e_{12}$ denotes the hazard value of an edge between the node 1 and the node 2. The node 1 and the node 2 denote nodes at two ends of a certain edge.

The gas concentration score, the abnormal sound score, and the image score may be determined by looking up a preset score table. The preset score table stores different gas concentrations, different abnormal vibration sounds, and different image data, which are determined through pre-evaluation. The preset score table also stores scores corresponding to the gas concentrations, different abnormal vibration sounds, and different image data. For more details about the gas concentration, the abnormal vibration sound, and the image data, please refer to FIG. 2 and its related descriptions.

The hazard value of an edge may be determined based on a count of historical unidentified hidden hazard points in a gas pipeline corresponding to the edge. The more historical unidentified hidden hazard points in the edge, the higher the hidden hazard value of the edge. Both the preset weight and a score threshold may be preset based on experience or set by default of the system.

In some embodiments, when a total hidden hazard score w of a certain edge exceeds the score threshold, there is a hidden hazard point in the edge.

In some embodiments, the smart gas pipeline network safety management platform may process the device diagram based on a diagram model and determine a count of hidden hazard points in each edge of the device diagram.

The diagram model may be a machine learning model, for example, a graph neural network (GNN).

In some embodiments, an input of a diagram model 520 may be a device diagram 510, and an output may be a count of hidden hazard points in each edge of the device diagram 530. In some embodiments, a count of edges including a hidden hazard point of the device diagram may be determined based on the count of hidden hazard points in each edge of the device diagram. For example, the count of edges including a hidden hazard point of the device diagram may be determined by excluding edges whose count of hidden hazard points is 0 of the device diagram.

In some embodiments, the diagram model may be trained and obtained through a plurality of third training samples with a third label. A training manner may include but is not limited to a gradient descent algorithm or the like.

In some embodiments, the third training sample may at least include a sample device diagram in historical data and be constructed based on a location of a historically marking device and a gas pipeline network. The third label may be an actual count of hidden hazard points in each side of each sample device diagram and may be marked on the constructed sample device diagram based on the historical data.

In some embodiments of the present disclosure, by processing the device diagram through the model, the count of hidden hazard points in each edge can be quickly and accurately determined, and the count of edges including hidden hazard points of the device diagram can be further determined to improve processing efficiency, providing a reliable data basis for a subsequent determination of a placement and distribution of marking devices and visual data display, which reduces an occurrence of missed inspections and ensures the quality of a gas inspection.

In some embodiments, the smart gas pipeline network safety management platform may mark the count of hidden hazard points in each edge output by the diagram model on the GIS map. For example, an edge including a hidden hazard point is represented by a different color, or information is embedded on the edge. When a user clicks on the edge, whether there is a hidden hazard point and a count of hidden hazard points may be shown.

In some embodiments, the smart gas pipeline network safety management platform may update at least one re-inspection route set and/or re-inspection route in various ways based on location information of the at least one hidden hazard point. For example, based on target positioning data in an original re-inspection set and the positioning information of the at least one hidden hazard point, the at least one re-inspection route set and/or the re-inspection route are updated by using a route planning algorithm.

In some embodiments, the smart gas pipeline network safety management platform may update the at least one re-inspection route set and/or re-inspection route based on the count of hidden hazard points in each edge of the device diagram output by the diagram model.

For example, if two nodes of an edge including a hidden hazard point both include marking devices and need to be re-inspected online, then positioning information of the hidden hazard point is included in a re-inspection set that needs an online re-inspection. As another example, if a count of hidden hazard points in an edge is 0, no offline re-inspection is needed, and the edge is not included in the re-inspection set that needs the online re-inspection.

In some embodiments of the present disclosure, the re-inspection set and/or re-inspection route are updated in a timely and accurate manner through edges including a hidden hazard point and counts of the edges output by the model, so as to avoid an occurrence of excessive inspection and missed-inspection and improve the inspection quality and efficiency.

In some embodiments of the present disclosure, the device diagram is constructed based on the marking device, and by considering historical unidentified hidden hazard point data in the historical data, it can be determined more accurately whether there is a hidden hazard point between different target positioning data, so as to carry out a targeted re-inspection, ensuring the quality of gas inspection and avoid the excessive inspection and missed-inspection.

In some embodiments of the present disclosure, based on an inspection analysis result, the re-inspection set is quickly determined, and then a reasonable re-inspection route is determined, which can effectively shorten a re-inspection time and a comprehensive cost of a re-inspection and improve the efficiency of the re-inspection.

One of one or more embodiments of the present disclosure provides a non-transitory computer-readable storage medium storing computer instructions, and when a computer reads the instructions stored in the storage medium, the computer executes a method for jointly processing a safety hazard based on a smart gas GIS.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures, or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or collocation of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "unit," "module," or "system." Furthermore, aspects of the present disclosure may take the form of a computer program product embodied in one or more computer readable media having computer-readable program code embodied thereon.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

In some embodiments, numbers describing the number of ingredients and attributes are used. It should be understood that such numbers used for the description of the embodiments use the modifier "about", "approximately", or "substantially" in some examples. Unless otherwise stated, "about", "approximately", or "substantially" indicates that the number is allowed to vary by ±20%. Correspondingly, in some embodiments, the numerical parameters used in the description and claims are approximate values, and the approximate values may be changed according to the required characteristics of individual embodiments. In some embodiments, the numerical parameters should consider the prescribed effective digits and adopt the method of general digit retention. Although the numerical ranges and parameters used to confirm the breadth of the range in some embodiments of the present disclosure are approximate values, in specific embodiments, settings of such numerical values are as accurate as possible within a feasible range.

For each patent, patent application, patent application publication, or other materials cited in the present disclosure, such as articles, books, specifications, publications, documents, or the like, the entire contents of which are hereby incorporated into the present disclosure as a reference. The application history documents that are inconsistent or conflict with the content of the present disclosure are excluded, and the documents that restrict the broadest scope of the claims of the present disclosure (currently or later attached to the present disclosure) are also excluded. It should be noted that if there is any inconsistency or conflict between the description, definition, and/or use of terms in the auxiliary materials of the present disclosure and the content of the present disclosure, the description, definition, and/or use of terms in the present disclosure is subject to the present disclosure.

Finally, it should be understood that the embodiments described in the present disclosure are only used to illustrate the principles of the embodiments of the present disclosure. Other variations may also fall within the scope of the present disclosure. Therefore, as an example and not a limitation, alternative configurations of the embodiments of the present disclosure may be regarded as consistent with the teaching of the present disclosure. Accordingly, the embodiments of the present disclosure are not limited to the embodiments introduced and described in the present disclosure explicitly.

What is claimed is:

1. An Internet of Things system for processing a safety hazard based on a smart gas Geographic Information System (GIS), wherein the Internet of Things system includes a smart gas user platform, a smart gas service platform, a smart gas pipeline network safety management platform, a smart gas pipeline network device sensor network platform, and a smart gas pipeline network device object platform;

the smart gas user platform includes a plurality of smart gas user sub-platforms;

the smart gas service platform includes a plurality of smart gas service sub-platforms;

the smart gas pipeline network safety management platform includes a smart gas pipeline network safety management sub-platform and a smart gas data center;

the smart gas pipeline network device sensor network platform is configured to interact with the smart gas data center and the smart gas pipeline network device object platform;

the smart gas pipeline network device object platform is configured to obtain inspection data of the gas GIS;

the smart gas pipeline network safety management platform is configured to obtain the inspection data of the gas GIS from the smart gas data center;

determine target positioning data for placing at least one marking device based on the inspection data of the gas GIS, wherein the at least one marking device is configured to obtain monitoring data of a target positioning area at least one time point;

the smart gas pipeline network safety management platform is further configured to:
   predict a level of hazard of at least one uninspected area based on the inspection data;
   determine the target positioning data for placing at least one marking device based on the level of hazard of the at least one uninspected area;
   determine an inspection analysis result based on the monitoring data and the inspection data, the inspection analysis result includes at least one of a technical category, whether a re-inspection is needed, or a re-inspection manner; determine at least one re-inspection route based on the inspection analysis result, wherein a feature of the re-inspection route includes at least one of a count of marking devices needing re-inspection, a sequence of re-inspection, or an attention level; and send the at least one re-inspection route to the smart gas service platform through the smart gas data center; and the smart gas service platform is configured to upload the at least one re-inspection route to the smart gas user platform.

2. The system according to claim 1, wherein the smart gas pipeline network safety management platform is further configured to:
   determine a monitoring feature based on the monitoring data, wherein the monitoring feature is a data feature extracted according to a preset rule; and
   determine the inspection analysis result based on the monitoring feature and the inspection data.

3. The system according to claim 1, wherein the smart gas pipeline network safety management platform is further configured to:
   determine at least one re-inspection set based on the inspection analysis result, the re-inspection set includes the at least one marking device and an inspection analysis result corresponding to the at least one marking device; and
   determine the at least one re-inspection route based on the at least one re-inspection set, and display visualized data on a GIS map.

\* \* \* \* \*